United States Patent [19]

Mittel et al.

[11] Patent Number: 5,025,251
[45] Date of Patent: Jun. 18, 1991

[54] SELF-TUNING DIRECT COUPLED DATA LIMITER OF A BATTERY SAVER TYPE PAGING RECEIVER

[75] Inventors: James G. Mittel, Boynton Beach; Walter L. Davis, Coral Springs, both of Fla.

[73] Assignee: Motorola, Inc., Schaumburg, Ill.

[21] Appl. No.: 373,299

[22] Filed: Jun. 29, 1989

[51] Int. Cl.$^5$ .................. H04Q 7/00; H04L 25/06; H04B 1/16
[52] U.S. Cl. .................. 340/825.44; 375/76; 375/88; 455/192; 455/214; 455/343; 307/351
[58] Field of Search .................. 340/825.44; 375/76, 375/80, 88; 307/351, 358; 328/117, 147, 164; 455/343, 195, 182, 192, 214

[56] References Cited
U.S. PATENT DOCUMENTS
4,631,737 12/1986 Davis et al. .................. 375/76

Primary Examiner—Donald J. Yusko
Assistant Examiner—Peter Weissman
Attorney, Agent, or Firm—Gregg Rasor; William E. Koch; Vincent B. Ingrassia

[57] ABSTRACT

A battery saver type paging receiver includes an improved peak and valley amplitude detection type data limiter section with mode control operation thereof, digital word storage of acquired peak and valley amplitude values, and self tuning capabilities. More specifically, the data limiter section includes a controller for controlling the peak and valley detection circuits to acquire respective peak and valley amplitude values in digital word form in a first operational mode and to hold the peak and valley amplitude digital words in corresponding storage registers in a second operational mode. The controller may transfer the data limiter section into a third operational mode during which the peak and valley digital words may be altered a predetermined count to effect a self-tuning thereof. In one embodiment, the third mode of operation is effected during the transfer between the second and first modes of operation.

9 Claims, 5 Drawing Sheets

SELF-TUNING DIRECT COUPLED DATA LIMITER OF A BATTERY SAVER TYPE PAGING RECEIVER

BACKGROUND OF THE INVENTION

The present invention relates to battery saver type paging receivers and data limiter sections thereof, and more particularly, to an improved peak and valley amplitude detection type data limiter section with mode control operation thereof, digital word storage of acquired peak and valley amplitude values, and self-tuning capabilities.

In a paging system, paging signals are transmitted from a paging transmitter to a multiplicity of portable, battery operated paging receivers according to a prespecified modulation format including serialized digitally coded sync, address, and message data words, for example. Each paging receiver includes an input stage which receives, demodulates, and converts the paging signal into an analog signal having a DC bias level that is dependent on the characteristics of both the receiver circuits and the modulation and a varying AC content which is representative of the serialized digitally coded modulated data of the paging signal.

The next stage of the paging receiver, commonly referred to as the data limiter section, compares the recovered analog signal in time with a threshold signal, which in the ideal case, is intended to be set at the amplitude of the DC content of the analog signal, in order to generate first and second amplitude signals, representative of one and another binary states, for the duration over which the amplitude of the analog signal is above and below the set threshold level, respectively, the serially generated binary states representing bits of the digitally coded words of the paging signal.

Because of the inability to implement ideal superheterodyne and demodulation functions in the input stage, it was recognized that the DC level could not be considered fixed, but rather relative to the recovered paging signal. Consequently, it was realized that the threshold level of the data limiter could not be simply set at a constant value, but rather had to be dynamically acquired from the immediate paging signal. Formerly, interface circuits employing a coupling capacitor were used to strip off the instantaneous DC content from the recovered analog signal so that the remaining AC content could be compared in time to a fixed level in order to convert the recovered analog signal to a binary bit serial stream of data.

However, these capacitively coupled circuits were found to be incompatible in operation with the battery saving techniques commonly used in the battery operated paging receivers. For a more detailed understanding of the drawbacks of capacitively coupled data limiter circuits, refer to the U.S. Pat. No. 4,631,737; issued Dec. 23, 1986 to Walter L. Davis et al.; and assigned to the same assignee as the present invention. The Davis et al. U.S. Pat. No. 4,631,737 is directed to a direct coupled data limiter circuit which utilizes peak and valley amplitude detectors for dynamically acquiring the instantaneous DC level of the recovered analog signal for use as the threshold level in converting the AC content to its corresponding binary bit serial form. By eliminating the coupling capacitor, the direct coupled circuit of Davis et al. may be rendered operationally compatible with the battery saving cycles of a paging receiver, albeit requiring not insubstantial time to acquire the threshold level.

More specifically, most paging transmission formats include a digitally coded word (sync word) to synchronize the operation of the various paging receivers to the digitally coded address words transmitted successively thereafter in a transmission cycle. Paging receivers customarily are preprogrammed with the slot of the sync word and the slot in which the corresponding address is expected to be transmitted with respect to the sync word. For example, as illustrated in time waveform A of FIG. 1, a sync word may be transmitted in slot 0 of a transmission cycle and the selective page address of our hypothetical paging receiver is preprogrammed to appear at slot 5 with respect thereto. Ideally then, selective circuitry of the paging receiver may be de-energized or put to "sleep" when not needed and energized or "awakened" only during the expected slots of the sync word and corresponding address, which example being illustrated in the time waveform B of FIG. 1.

Battery saving techniques of the paging receiver seek to optimize the control of the battery power supply to selected circuitry thereof by matching the sleep and awake periods as close to the ideal case as practically possible as shown in time waveform B of FIG. 1. One practical limitation to this desired optimization arises as a result of utilizing a peak and valley amplitude detection data limiter circuit in which a substantial amount of time is needed prior to a binary conversion in order to guarantee statistically that at least one peak and at least one valley occurs in the recovered analog signal during the acquisition of the instantaneous threshold level required for the succeeding binary conversion.

Another limitation results from the use capacitors in the data limiter circuit to store the obtained peak and valley signals for a subsequent binary conversion. Since it is a well known phenomenon that a signal stored across a capacitor decays with time due to capacitor leakage, and since the time between binary conversions is not predictable under all circumstances, it was considered prudent practice heretofore to re-acquire new peak and valley signals and corresponding new threshold level immediately preceding each potential sync and address word slot in a transmission cycle. This practice is illustrated by the hatched periods in the time waveform C of FIG. 1. Thus, in most present battery saver type paging receivers, a considerable amount of battery energy is consumed for this purpose rendering a less than optimal battery saving performance thereof.

Accordingly, it is the intent of the present invention to ameliorate the aforementioned limitations of a peak and valley amplitude detection data limiter circuit in order to move closer in operation to ideal battery energy conservation practices to achieve a longer operating life of the paging receiver over the useful life of the battery source thereof.

SUMMARY OF THE INVENTION

A battery saver type paging receiver includes an input section which receives a paging signal, modulated with digitally coded data words and transmitted from an external source, and demodulates the received paging signal to recover an analog signal representing the digitally coded data word. A data limiter section of the paging receiver converts the recovered analog signal into a corresponding binary bit stream representing the coded data words of the paging signal. A battery saver section of the paging receiver physically energizes and de-energizes the input and data limiter sections from a battery power source during awake and sleep periods, respectively.

In accordance with the present invention, the data limiter section comprises first means operative in a first mode to acquire a peak amplitude from the recovered analog signal and to generate a first digitally coded word representative thereof; and second means operative in the first mode to acquire a valley amplitude from the recovered analog signal and to generate a second digitally coded word representative thereof. The first and second means includes respectively a first storage means for storing the first digital word and a second storage means for storing the second digital word. The first and second means are operative in a second mode to cause their respective storage means to hold the respective digital word thereof.

In addition, the first and second means may be each further operative in a third mode to alter the respective first and second digital words thereof a predetermined count. In one embodiment, the first digital word is decremented and the second digital word is incremented a single count in the third mode.

Still further, the data limiter section may include control means responsive to at least one command signal to control the transfer of operation of the first and second means among the first, second and third modes. In one embodiment, the control means is governed by a reference clock signal in controlling the transfer among the modes of the first and second means. In still another embodiment, the control means may control the first and second means into the third mode of the operation during a transfer from the second mode to the first mode of operation.

Still further, the first and second modes may be operatively correlated with the awake and sleep periods of the battery saver section. In another embodiment, the first and second storage means of the data limiter section remain energized during the sleep periods of the battery saver section in order to hold the first and second digital words respectively stored therein.

DESCRIPTION OF THE PREFERRED EMBODIMENT

Figure 1:
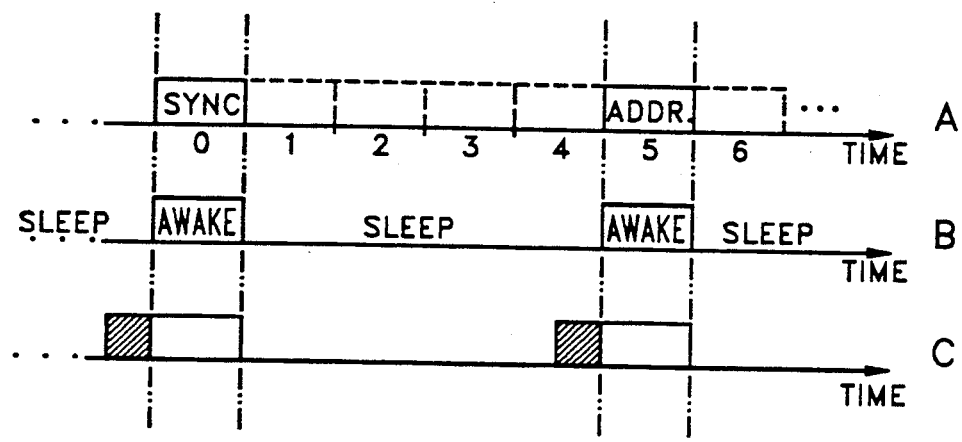
FIG. 1 includes time waveforms A, B and C which illustrate battery saving operations of a paging receiver including a direct coupled data limiter section.
Figure 2:
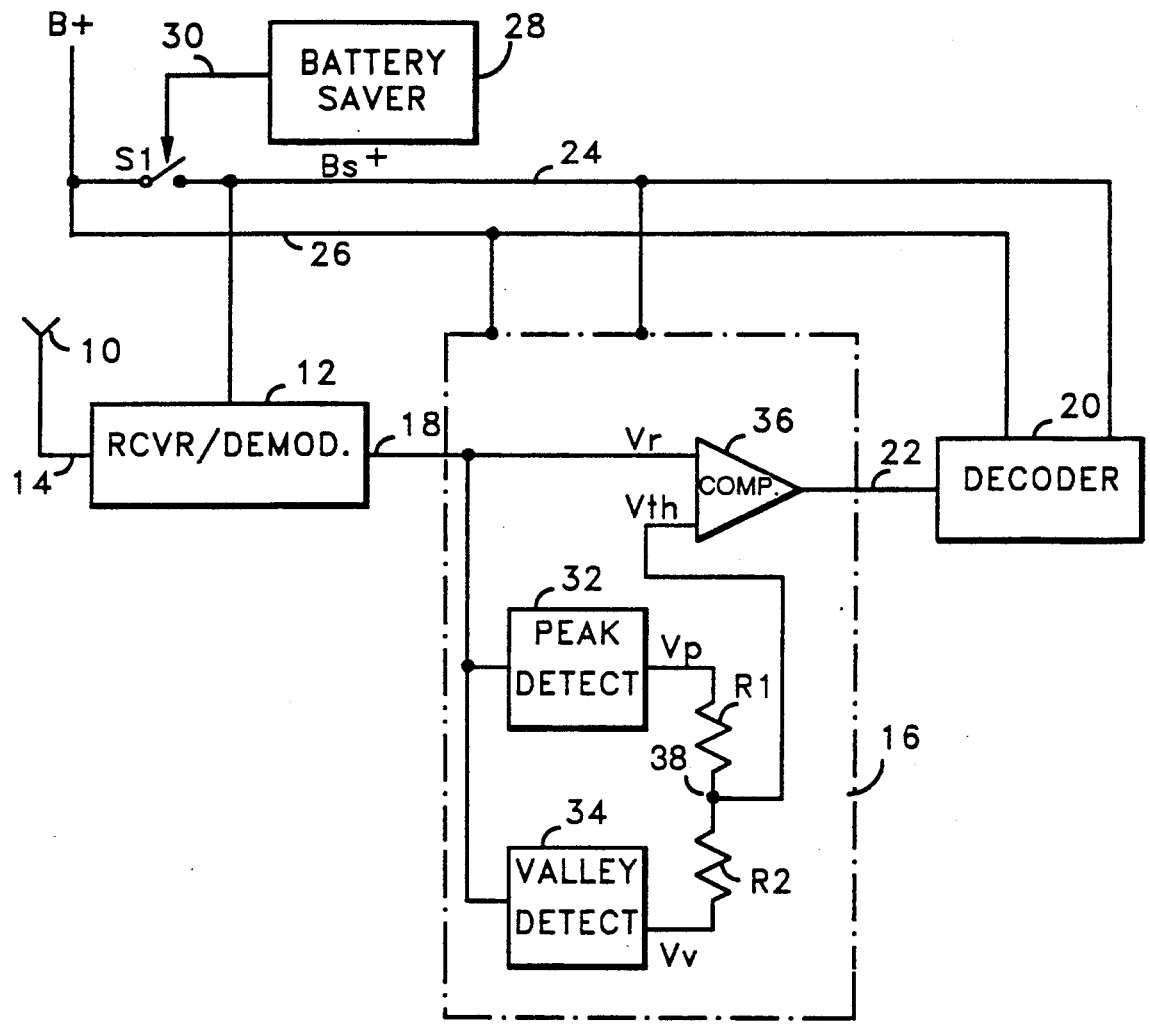
FIG. 2 is a block diagram schematic of a paging receiver suitable for embodying the principles of the present invention.

Referring to FIG. 2, a conventional paging receiver antenna 10 is coupled to a receiver/demodulator input stage 12 using signal line 14. The input section 12 is coupled to a peak and valley detection type data limiter, shown enclosed in dot-dashed lines 16, using signal line 18. The data limiter 16 is coupled to a decoder section 20 using signal line 22. A battery powered source, denoted as B+, is coupled indirectly through a switch S1 to the input section 12, and selected circuits of the data limiter 16 and decoder 20 utilizing signal line 24 and also directly coupled to other circuits of the data limiter 16 and decoder 20 through signal line 26. A conventional battery saver circuit 28 is coupled to switch S1 over a signal line 30 for the power interruption control thereof in accordance with awake and sleep periods of a battery saving cycle as illustrated by the time waveform B of FIG. 1.

More specifically, the data limiter section 16 includes a peak detect circuit 32, a valley detect circuit 34, and a comparison circuit 36. The signal line 18 is coupled to one input of the comparison circuit 36 and also to inputs of the detect circuits 32 and 34. The outputs of the peak and valley detect circuits 32 and 34 are coupled to respective ends of a resistor divider network comprising resistors R1 and R2. The node connection 38 of resistors R1 and R2 is coupled to another input of the comparison circuit 36. The output of the comparison circuit 36 is coupled over signal line 22 to the decoder 20.

Depending upon the circuit family used in implementing the paging receiver, the battery powered source B+ may be either a voltage or current supply. For example, if a voltage driven transistor circuit family, like CMOS, for example, is used, the supply B+ is a voltage supply, and conversely, if a current driven transistor circuit family, like integrated injection logic I2L, for example, is used, then B+ is a current source. In addition, while the supply B+ is depicted as being directly coupled over signal line 26 to certain circuits of the data limiter 16 and decoder 20, during certain periods of the battery saver control, the current and/or voltage supply to these circuits may be substantially reduced but not entirely interrupted.

In a typical operation, a paging signal including modulated digitally coded data words and transmitted from an external source may be received by the antenna 10 and conducted over signal line 14 to the input section 12 wherein it is conditioned by the conventional receiver and demodulation circuits thereof to recover an analog signal which is conducted over signal line 18 to the data limiter section 16. The recovered analog signal includes a DC content which is representative of a modulation reference level and an AC content which is dependent on the characteristics of both the receiver circuit 12 and the modulated digitally coded data words.

As described in connection with the time waveforms A and B of FIG. 1 in the Background section hereabove, the battery saver circuit 28 closes and opens switch S1 to cyclically energize and de-energize the input section 12, and selected circuits of the data limiter 16 and decoder 20 during awake and sleep periods, respectively, thereof. Accordingly, the input section 12 is operative to effect the recovered analog signal which is conducted over signal line 18 to the data limiter 16 solely during awake periods of the battery saver 28. Further, the awake and sleep periods of the battery saver controller 28 are strongly correlated with the anticipated time slots of the sync word and pager address as illustrated in FIG. 1.

During awake periods of energization, the peak detector 32 acquires a peak amplitude from the recovered analog signal and generates an analog signal Vp representative thereof. Concurrently, the valley detect circuit is energized to acquire a valley amplitude signal from the recovered analog signal and generates an analog signal Vv representative thereof. The signals Vp and Vv are averaged by the resistor divider network R1 and R2 to effect at the node 38 a threshold analog level Vth which is compared in time to the reference analog signal in the comparison circuit 36 to produce a serial binary bit data stream representing the modulated data word corresponding to the energized time slot. The converted binary bit data stream is conducted to the decoder 20 over signal line 22. For a more detailed operational description of a conventional paging receiver with power conservation, reference is made to the U.S. Pat. No. 4,518,961 entitled "Universal Paging Device with Power Conservation"; issued to Walter L. Davis et al. on May 21, 1985 and assigned to the same assignee as the instant application.

Figure 3:
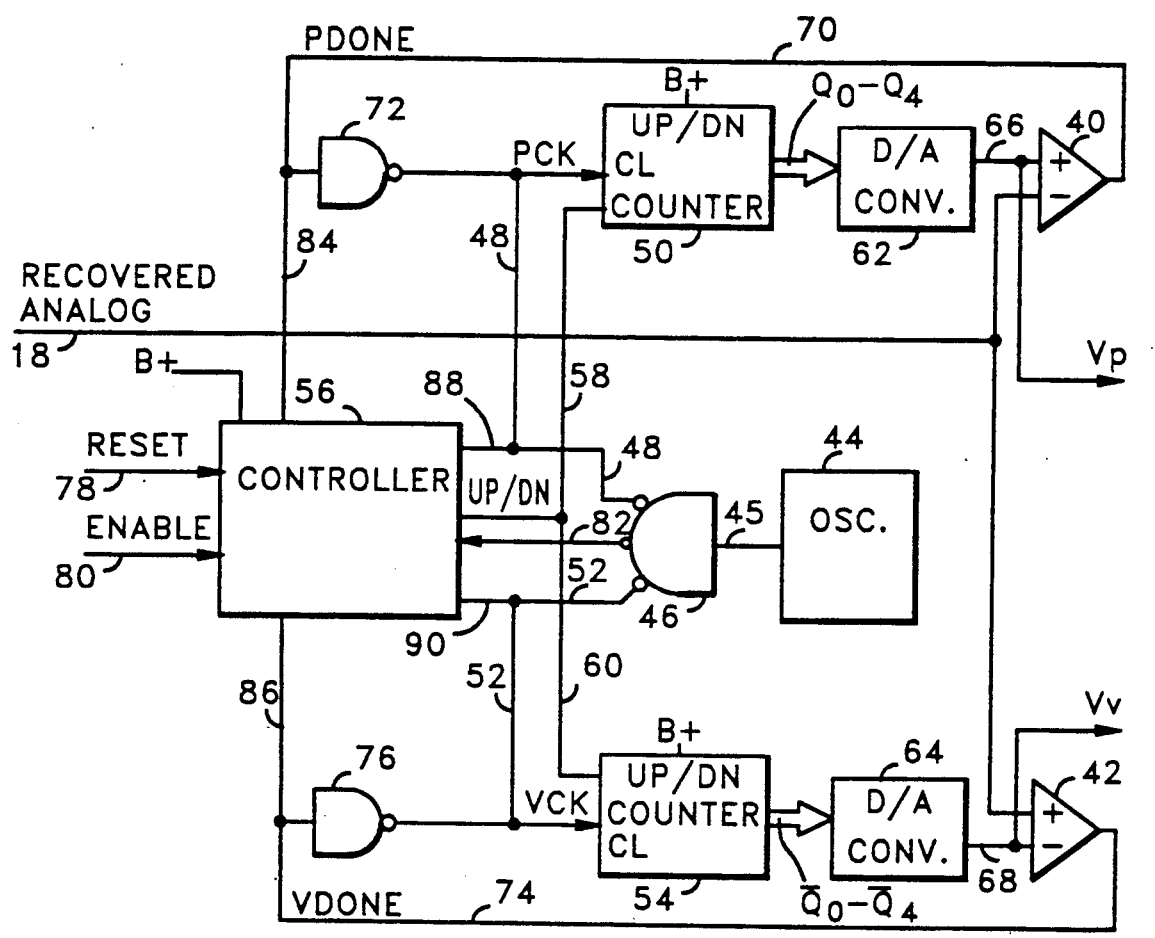
FIG. 3 is a block diagram schematic of a peak and valley detection type data limiter suitable for use in the embodiment of FIG. 2.

Peak and valley detection circuits 32 and 34 of a data limiter embodiment of the present invention are shown in the block diagram schematic of FIG. 3. Referring to FIG. 3, the signal line 18 carrying the recovered analog signal may be conducted to an inverting input (−) of one comparator circuit 40 and to a non-inverting (+) input of another comparator circuit 42. A conventional reference oscillator circuit 44 is coupled over signal line 45 to an input of a I2L gate 46. One output of the I2L gate 46 is coupled over signal line 48 to the clock input of an up/down counter 50. Another output of the I2L gate 46 is coupled over signal line 52 to the clock input of another up/down counter 54.

In the present embodiment, the up/down counters 50 and 54 comprise a plurality of flip-flop register circuits conventionally arranged in counter stages which are controlled to count up or down, dependent on a control signal UP/DN which is produced by a controller circuit 56 and conducted to the counters 50 and 54 over signal lines 58 and 60. More particularly, in the present embodiment, the counters 50 and 54 include five conventional binary flip-flop stages configured to count up and down wherein the Q outputs $Q_0$–$Q_4$ of the flip-flops of counter 50 correspond to the binary signals $2^0$–$2^4$, respectively, and conversely, in counter 54, the flip-flop outputs $Q_0$–$Q_4$ correspond to the binary signals $2^0$–$2^4$, respectively. Accordingly, when counter 50 is directed to count up by the signal 58, the signals $Q_0$–$Q_4$ will increase in binary steps at a rate consistent with the clock signal of signal line 48. Conversely, when the counter 54 is instructed to count up by the signal 60, the signals $Q_0$–$Q_4$ will decrement at a rate consistent with the clock signal of signal line 52, i.e. count down in a binary fashion. Each of the counters 50 and 54 may further include conventional rollover and rollunder protection circuits to prevent such conditions from occurring.

The signal lines $Q_0$–$Q_4$ of counter 50 are conducted to corresponding binary inputs of a digital-to-analog (D/A) converter 62 and the signal lines $Q_0$–$Q_4$ of counter 54 are coupled respectively to binary inputs of another D/A converter 64. The output of converter 62 is coupled over signal line 66 to a non-inverting (+) input of the comparator circuit 40 and the output of the D/A converter 64 is coupled over signal line 68 to an inverting (−) input of the comparator circuit 42. In addition, the outputs of the D/A converters 62 and 64 are coupled to the ends of the resistor divider network R1 and R2 as the peak amplitude and valley amplitude analog signals Vp and Vv, respectively, as described in connection with the embodiment of FIG. 2. Still further, the output of the comparator 40 is coupled over signal line 70 to an input of a I2L gate 72. Similarly, the output of the converter 42 is coupled over signal line 74 to an input of another I2L gate 76. The outputs of the I2L gates 72 and 76 are coupled respectively to the clock signal lines 48 and 52 for control thereof.

In the present embodiment, two command signals, labelled as RESET and ENABLE, are coupled to the controller 56 over signal lines 78 and 80. In addition, another clock signal output of the I2L gate 46 is coupled over signal line 82 to the controller 56. In response to the command signals RESET and ENABLE and governed by the clock signal of signal line 82, the controller 56 generates a plurality of control signals for controlling the peak and valley detection circuits in a plurality of operational modes as will be described in greater detail hereinbelow. One control signal is coupled over signal line 84 to the signal line 70. Another control signal is coupled over signal line 86 to the signal line 74. Other control signals are coupled over signal lines 88 and 90 to the signal lines 48 and 52, respectively.

Figure 4:
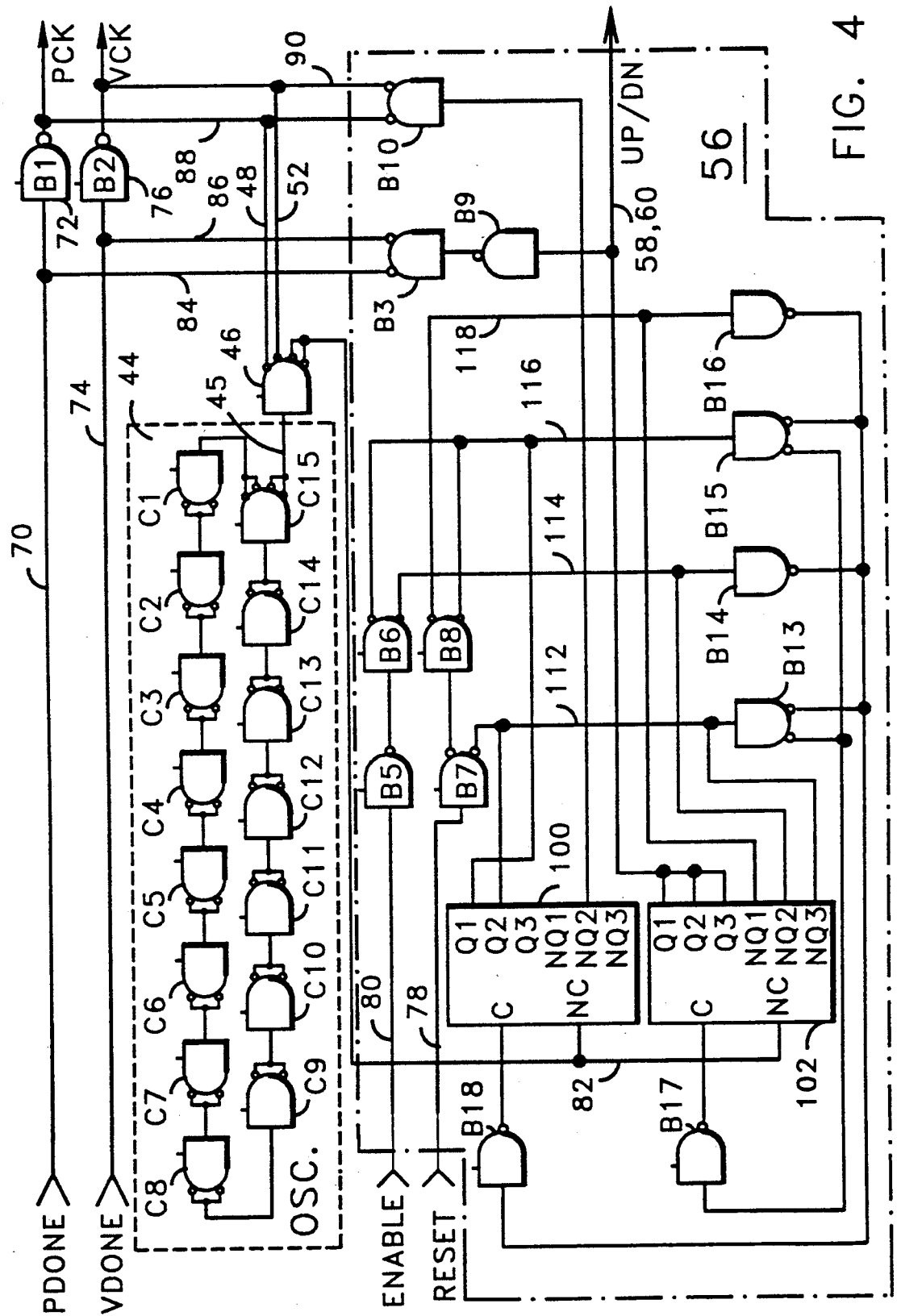
FIG. 4 is a logic circuit schematic of an oscillator and controller suitable for use in the embodiment of FIG. 3.

Suitable embodiments for the oscillator circuit 44 and controller circuit 56 are shown in the logic circuit schematic of FIG. 4. Referring to FIG. 4, an exemplary oscillator circuit 44 is shown comprising 15 I2L gates C1–C15 cascadedly coupled, output to input, forming a completed ring with one of the outputs of the I2L gate C15 being used as the reference clock signal which is coupled over the signal line 45 to the input of the I2L gate 46. Upon being energized, the oscillator 44 produces a square wave reference clock signal which is coupled through the inverter gate 46 and over the signal lines 48, 52, and 82, concurrently. The clock signals of the signal lines 48 and 52 become the clock signals PCK and VCK which govern the counting of the counters 50 and 54, respectively. The reference clock signal conducted over signal line 82 is coupled to the NC inputs of two D-type flip-flops 100 and 102 of the control circuit 56 which is shown enclosed in dot-dashed lines.

The command signals RESET and ENABLE are coupled over signal lines 78 and 80 to inputs of respective I2L gates B7 and B5, the outputs of which being respectively coupled to the inputs of I2L gates B8 and B6. Another output of I2L gate B7 is coupled over signal line 112 to the input of another I2L gate B13. In addition, outputs of I2L gates B6 and B8 are coupled respectively to inputs of I2L gates B14 and B15 over signal lines 114 and 116. Another output of I2L gate B8 is coupled to the input of I2L gate B16 over signal line 118. Still further, an output of each I2L gate B13 and B15 is coupled commonly to the input of another I2L gate B17 having its output coupled to the D-input of the flip-flop 102. Still further, an output of each of the I2L gates B13–B16 is coupled commonly to an input of another I2L gate B18 having its output coupled to the D-input of the flip-flop 100.

The outputs of the flip-flop 100, denoted as Q1 and Q2, are coupled respectively to the signal lines 116 and 112. The outputs Q1–Q3 of the flip-flop 102 are coupled together and commonly to the signal lines 58 and 60 and also to the input of another I2L gate B9. An inverted output of flip-flop 100, denoted as NQ2, is coupled to the input of another I2L gate B10. Inverted outputs, denoted as NQ1, NQ2, and NQ3, of flip-flop 102 are coupled respectively to the signal lines 118, 114, and 112. The output of the I2L gate B9 is coupled to another I2L gate B3, the outputs of which being coupled over the signal lines 84 and 86 to the signal lines 70 and 74, respectively.

Figure 5:
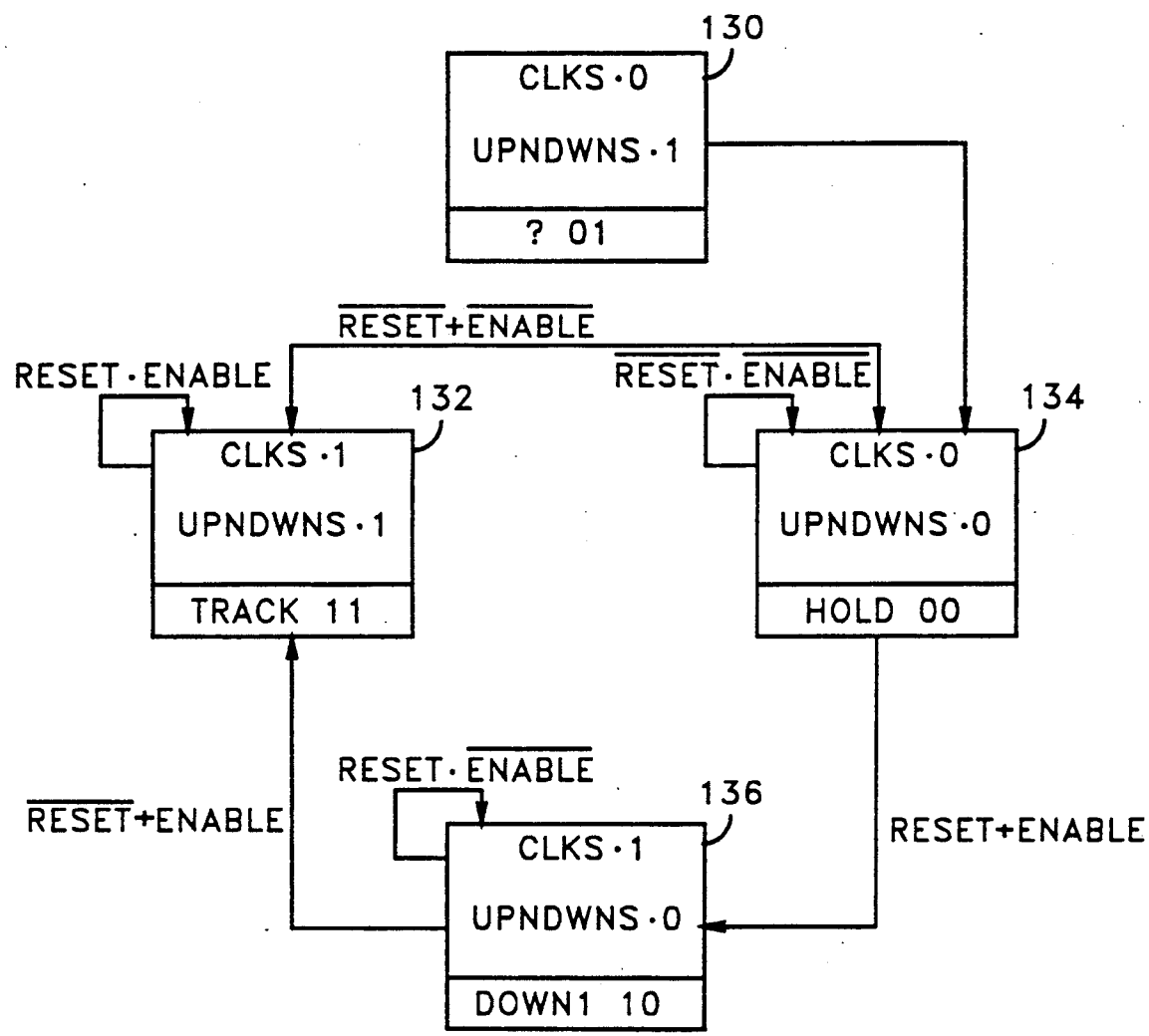
FIG. 5 is a state diagram illustrating the various operational modes of the data limiter embodiment of FIG. 3 and the logic states for effecting a transfer therebetween.

The operation of the data limiter 16 will now be described in connection with the preferred embodiment depicted in FIGS. 3 and 4 and an operational mode state diagram depicted in FIG. 5. In order to better appreciate the state diagram of FIG. 5 in relation to the embodiment diagrams of FIGS. 3 and 4, some correlation of signal labelling need to be explained. For example, the signal CLKS correlates to the output of the I2L gate B10 conducted over the signal lines 88 and 90. In addition, the signal UPNDWNS correlates to the output of the I2L gate B3 conducted over signal lines 84 and 86. In addition, for the present embodiment, the operational mode state shown by the block 130 in FIG. 5 is an unstable state. Accordingly, the state of the control circuit 56 is automatically transferred to that of another block dependent on the states of the command signals RESET and ENABLE. In the particular embodiment, there are three stable operational mode states—the first mode being referred to as the track mode and shown by the block 132, the second mode referred to as the hold mode shown by the block 134, and the third operational mode referred to as the DOWN1 mode shown by the block 136.

When both of the command signals RESET and ENABLE are a logical one, the controller 56 responds by maintaining the data limiter circuit 16 in the the track operational mode, illustrated by block 132, in which case the logical states of the control signals over lines 84, 86, 88, and 90 are all effected to a logical one. In this track state, a reference clock signal generated by the oscillator circuit 44 is conducted over signal line 48, via signal line 45 and I2L gate 46, to the clock input of the counter 50. With the up/down signal over signal line 58 in a logical one state, (see block 132) the counter 50 responds by counting up which causes an increase in the output analog signal (line 66) of the D/A converter 62. The generated analog signal 66 of converter 62 is compared with the recovered analog signal 18 in the comparator 40 and when the amplitude of the generated analog signal exceeds that of the recovered analog signal, the output signal PDONE of the comparator 40 is effected to a logical one which causes the output of the I2L gate 72 to be rendered a logical zero which, in effect, inhibits the reference clock signal from further driving the counter 50. The digital word $Q_0-Q_4$ generated by the counter 50 is sustained in the registers thereof until the recovered analog signal 18 again exceeds the amplitude of the generated analog signal 66 during the track mode. While sustained, in the track mode, the digital word $Q_0-Q_4$ stored in the counter 50 causes a fixed analog peak amplitude signal Vp to be output from the converter 62.

Concurrently in the track mode, the counter 54 is driven by the reference clock signal over signal line 52, via signal line 45 and I2L gate 46, to also count up as controlled by the UP/DN signal over line 60. However, coupling the inverted outputs $Q_0-Q_4$ of the flip-flops of counter 54 to the converter 64 causes the output analog signal (signal line 68) thereof to decrease in amplitude as counter 54 is counted up. Once the amplitude of the generated analog signal 68 drops below the amplitude of the recovered analog signal 18, the comparator 42 effects a logical one signal VDONE, which causes the I2L gate 76 to produce a logical zero at the output thereof which effectively inhibits the VCK clock signal from further driving the counter 54. The generated digital word $Q_0-Q_4$ of counter 54 is sustained in the registers thereof until the recovered analog signal 18 falls below the amplitude of the generated analog signal 68 during the track mode. While sustained, in the track mode, the digital word $Q_0-Q_4$ stored in the counter 54 causes a fixed analog valley signal Vv to be output from the converter 64.

When either one of the command signal RESET or ENABLE is changed in logical state to a logical zero, the controller 56 responds by transferring the operational mode of the data limiter 16 to the hold state shown at block 134. However, in order to stabilize and maintain the operation of the hold mode, both of the command signals RESET and ENABLE must, for the present embodiment, be brought to a logical zero. Under these conditions, the control signals of the signal lines 84, 86, 88, and 90 are effected to a logical zero which inhibit further tracking operation of the peak and valley detection circuits. The peak and valley digital words are stored in the registers of the counters 50 and 54, respectively, for the duration of the hold mode of block 134.

In order for the controller 56 to transfer the data limiter 16 to the third operational mode of block 136, either the RESET signal or the ENABLE signal must, for the present embodiment, be effected to a logical one; however, in order to stabilize in the third mode, the RESET and ENABLE signals should be a logical one and a logical zero, respectively. In the operational mode of block 136, the digital words of the counters 50 and 54 are altered by a predetermined count which provides a self-tuning thereof. More specifically, in the present embodiment, the digital word of counter 50 is decreased by one count and the digital word of counter 54, while not actually decreased by one count, is effectively decreased by one count by using the inverted outputs of the registers thereof. After altering the count of the digital words of counters 50 and 54, the operational mode may be transferred by the command signals RESET and ENABLE to the track mode 132.

It is understood that a count of more than one may be effected by the operational mode 136 to alter the digital words of the counters 50 and 54 by merely extending the duration of time thereof. This will be more fully understood by referring to the reference clock signal timing waveform diagram of FIG. 6.

Figure 6:
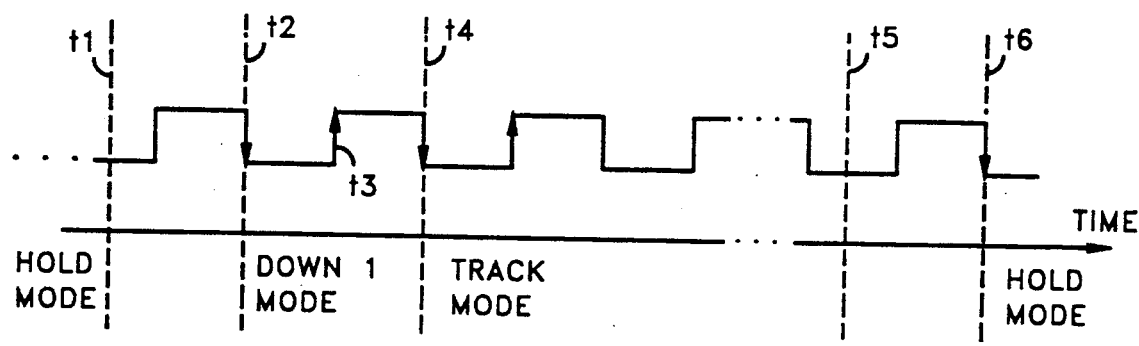
FIG. 6 is a time waveform diagram illustrating the governing of the controller depicted in FIG. 4 in its control of transfer among the various operational modes of the data limiter by a reference clock signal.

As described above, the controller 56 may be governed by the reference clock signal conducted thereto over signal line 82, via signal line 45 and I2L gate 46, to synchronize the operational mode transfer control to one edge of the signal waveform thereof. More specifically, since, in the present embodiment, the reference clock signal is conducted to the NC inputs of the bistable registers 100 and 102, the outputs thereof may only change state on falling edges of the reference clock signal. Referring to FIG. 6, suppose previous to time t1, the controller 56 is controlling the data limiter 16 in the hold operational state, and at time t1, the command signals RESET and ENABLE change state to effect a transfer to the DOWN1 operational state. However, the transfer to DOWN1 will not be effected until the next falling edge of the clock reference signal triggers the bistable registers 100 and 102 at time t2.

In the DOWN1 mode, the signal lines 88 and 90 are in a state to allow the reference clock signal conducted over signal lines 48 and 52 to drive the counters 50 and 54, respectively. Thus, at the next positive going edge of the reference clock signal at time t3, the counters 50 and 54 are decreased by one count. Assuming that at some time after t3 but before the next falling edge of the reference clock signal, the command signals RESET and ENABLE are changed in state to cause a transfer to the track mode, such transfer is effected at the next falling edge of the reference clock signal at time t4. Accordingly, should a digital word alteration of more than one count be desired, then the duration of the DOWN1 operational mode could be extended by the command signals RESET and ENABLE through as many positive edges of the reference clock signal as desired prior to causing a transfer of control to the track operational mode.

Correspondingly, while in the track mode, should the states of the command signals be altered to effect a transfer to the hold mode of the block 134, say at time t5, for example, then at the next falling edge of the clock reference signal at t6, the transfer is effected. In this manner, the control circuit 56 may control the transfer among operational modes of the data limiter 16 in response to the command signals RESET and ENABLE and governed by the clock reference signal of the oscillator 44.

In a typical operation, the track and hold operational modes of the data limiter 16 may be correlated in time to the awake and sleep periods of the battery saver cycles as shown by the exemplary time waveform B of FIG. 1. An initial peak and valley amplitude acquisition, which may require an extended awake period as illustrated by the shaded portion of an awake period of the time waveform C of FIG. 1 may be commanded upon power turn on of the paging receiver. However, a reacquisition of new peak and valley amplitudes for each awake period is not needed unless the power to the paging receiver is turned off and turned on again.

Once acquired, the peak and valley amplitude values are stored as digital words in the counters 50 and 54 and are maintained therein even during the sleep periods of the battery saver cycles. More particularly, in the present embodiment, the battery power supply B+ may be coupled directly to the counters 50 and 54 and to selected circuits of the controller 56 over line 26 in order to maintain energization thereof to hold the digital states of the peak and valley digital words during the sleep or deenergization periods of the battery saver controller 28.

As described in connection with the state diagram of FIG. 5, a self-tuning of the peak and valley amplitude digital words may be accomplished with a transfer to the DOWN1 mode between a controlled transfer from the hold mode 134 to the track mode 132. If the peak and valley amplitudes of the recovered analog signal are unchanged over a battery saver cycle, then count alteration caused by the DOWN1 operational mode will quickly be reinstated at the next track mode. However, if a false peak and/or valley amplitude is acquired inadvertently or if the peak and/or valley amplitude of the recovered analog signal has changed over a battery saver cycle, due to temperature changes, changes in the input signal, etc. the alteration effected by the DOWN1 mode causes the false or incorrect generated digital word to converge incrementally to the correct amplitude values with each battery saver cycle rendering a fine tuning thereof. This self-tuning operation may also continue during each track mode by permitting the peak and valley amplitudes generated by the counters 50 and 54 to track the current peak and valley amplitude of the recovered analog signal to correct for small perturbation thereof with time and temperature.

While the present invention has been described hereabove in connection with a particular embodiment, it is understood that additions and changes may be made without deviating from the principles of the present invention. Accordingly, the present invention should not be limited to any single embodiment, but rather construed in breadth and scope in accordance with recitation of the appended claims.

We claim:

1. A battery saver type paging receiver including: an input section for receiving a paging signal transmitted from an external source, said paging signal including modulated digitally coded data words, and for demodulating said received paging signal to recover an analog signal representing the digitally coded data words; a data limiter section for converting the recovered analog signal into a corresponding binary bit stream representing the coded data words of said paging signal; and a battery saver section coupled to said input section and said data limiter section and to a battery powered source for cyclically energizing and de-energizing said input and data limiter sections from said battery powered source during awake and sleep periods, respectively, said data limiter section comprising:

first means operative in a first mode to acquire a peak amplitude from the recovered analog signal and to generate a first digital word representative thereof, said first means including a first storage means for storing the first digital word, said first means operative in a second mode to cause said first storage means to hold the first digital word;

second means operative in said first mode to acquire a valley amplitude from the recovered analog signal and to generate a second digital word representative thereof, said second means including a second storage means for storing the second digital word, said second means operative in said second mode to cause said second storage means to hold the second digital word;

said first and second means being each further operative in a third mode to alter the respective first and second word thereof a predetermined count;

control means responsive to at least one command signal to control the transfer of operation of said first and second means among the first, second and third modes;

third means for converting the recovered analog signal into its corresponding binary bit stream based on said first and second digital words; and means for generating a reference signal wherein the control means is governed by the reference clock signal in controlling the transfer among the modes of the first and second means.

2. The paging receiver of claim 1 wherein the first and second means are each further operative in the third mode to decrement the first word and increment the second word thereof a single count.

3. The paging receiver of claim 1 wherein the control means is further responsive to the at least one command signal and governed by the reference clock signal to control the first and second means into the third mode of operation during a transfer from the second mode to the first mode of operation.

4. The paging receiver of claim 1 wherein the first means includes a first up/down counter for generating the first digital word during said first mode; a digital-toanalog converter governed by the first digital word to generate a first analog signal representative thereof; and a means for comparing the first analog signal with the recovered analog signal and for generating a first output signal when an instantaneous peak amplitude is reached to control the first up/down counter in generating the first digital word; wherein the second means includes a second up/down counter for generating the second digital word during said first mode; a digital-to-analog converter governed by the second digital word to generate a second analog signal representative thereof; and a means for comparing the second analog signal with the recovered analog signal and for generating a second output signal when an instantaneous valley amplitude is reached to control the second up/down counter in generating the second digital word; and wherein the control means is responsive to the at least one command signal to enable the first and second up/down counters to generate the respective first and second digital words thereof during the first mode, to inhibit said generation of and cause the first and second up/down counter to hold the respective first and second digital words thereof during the second mode, and to alter the first and second digital words of the respective first and second up/down counters by a predetermined count during the third mode.

5. The paging receiver of claim 4 wherein the data limiter includes means for generating a reference clock signal; and wherein the control means is governed by the reference clock signal in controlling the transfer among the first, second, and third modes of operation.

6. The paging receiver of claim 5 wherein the first and second up/down counters are driven by the reference clock signal is generating the respective first and second digital words thereof during the first mode of operation thereof, the reference clock signal inhibited from driving the first and second up/down counters during the second mode of operation thereof; and wherein the control means causes a predetermined number of clock pulses of the reference clock signal to drive the first and second up/down counters to decrement the first digital word and increment the second digital word thereof, respectively, during the third mode of operation.

7. The paging receiver of claim 6 wherein the control means controls the transfer to the third mode of operation during a transfer from the second mode to the first mode of operation.

8. The paging receiver of claim 1 wherein the first and second modes are operatively correlated with the awake and sleep periods of the battery saver section.

9. The paging receiver of claim 8 wherein the first and second storage means of the data limiter section remain energized during the sleep periods of said battery saver section in order to hold the first and second digital words respectively stored therein.

* * * * *